United States Patent [19]

Geren et al.

[11] 4,214,313
[45] Jul. 22, 1980

[54] MULTIPLE SONAR MASKING AND JAMMING COUNTERMEASURE SYSTEM

[75] Inventors: Keith E. Geren; Warren A. Sauer; Donald A. Young, all of San Diego, Calif.

[73] Assignee: The United States of America as represented by the Secretary of the Navy, Washington, D.C.

[21] Appl. No.: 106,420

[22] Filed: Apr. 27, 1961

[51] Int. Cl.² .............................................. H04K 3/00
[52] U.S. Cl. ........................................ 367/1; 367/2; 367/137
[58] Field of Search .................. 340/2, 5, 5 D, 3, 3 E; 343/18, 6.8; 181/0.51

[56] References Cited

U.S. PATENT DOCUMENTS

| | | | |
|---|---|---|---|
| 2,548,905 | 4/1951 | Odenweller et al. | 116/27 |
| 2,623,605 | 12/1952 | Edelman et al. | 181/0.5 |
| 2,887,671 | 5/1959 | Frankel et al. | 340/3 |
| 2,960,664 | 11/1960 | Brodwin | 343/18 |
| 2,975,396 | 3/1961 | Mueller | 340/5 |
| 2,981,927 | 4/1961 | McKenney | 340/2 |

*Primary Examiner*—Richard A. Farley
*Attorney, Agent, or Firm*—R. S. Sciascia; G. J. Rubens

EXEMPLARY CLAIM

1. A masking-jamming sonar countermeasure system comprising in combination, a receiver, a transmitter, a sequence timer connected between said receiver and said transmitter for regulating the operative time intervals thereof, and means coupled to the input of said transmitter for driving same with predetermined sonar signals and psuedo noise signals alternately applied thereto on a time-shared basis.

19 Claims, 4 Drawing Figures

MULTIPLE SONAR MASKING AND JAMMING COUNTERMEASURE SYSTEM

The invention described herein may be manufactured and used by or for the Government of the United States of America for Governmental purposes without the payment of any royalties thereon or therefor.

The present invention relates, in general, to devices for masking and jamming enemy sonar systems and, in particular, is a countermeasure system for effectively masking passive enemy sonar systems while jamming the echo-ranging signals of a plurality of active enemy search sonar systems on a time-shared basis.

Antisubmarine warfare has become progressively more complex in recent years, and the submariner must now be prepared to defend himself against a coordinated attack of many different types of enemy vessels and weapons. Under such circumstances, it becomes necessary to either destroy or decoy the search signals or listening ability of enemy sonar equipment in order to effect offensive or defensive operations with respect to the vessel or vessels making the attack.

The listening ability of passive enemy sonar apparatus may be reduced considerably, if not substantially eliminated, by random noise masking of any acoustical signals that may be generated by your own or other friendly vessels and equipment. This is true because passive enemy sonars make use of characteristic sounds radiated by ships, submarines, torpedoes, and the like to detect, identify, and track them during combat or reconnaisance maneuvers. Since so doing is dependent on listening, contact range is limited by the level of the signals generated by the target, in this case your own vessel, one-way propagation losses, and the level of ambient noise and interference at the listening point. Although, in many instances, the signals or sounds generated by a vessel cannot be reduced beyond a given minimum level and still have the vessel be operatively effective, it has been found that masking is substantially optimized by broadcasting a broadband of random sonic noise signals within approximately the five to seventy kilocycle range in the general subaqueous vicinity of the enemy vessel, and that so doing thus renders the passive sonar listening equipment thereof ineffective for most practical purposes.

Active sonar systems of the pinging type usually transmit intense acoustic CW signals of short duration and then listen for echoes from a target. The maximum range at which echo-ranging contact can be made is dependent upon, among other things, the intensity of the transmitted signal, size of the target, spreading of the signal on the way to and from the target, water attenuation, noise or interference level at the receiver, and the reberberation level. Therefore, many sonar sets are tailor-made to suit one or more combat purposes and, accordingly, the frequencies, ping lengths, and power utilized during echo-ranging operations, may vary considerably. Moreover, several sonar sets utilizing different inherent characteristics may be used by the enemy, as warranted by any given circumstances. Thus, due to these factors, it can readily be seen that consideration must be given to the receiving and transmitting portions of the subject countermeasure system to insure that all probable operational ramifications and contingencies will be adequately covered, and, to do so, obviously necessitates incorporating broadband operational characteristics and appropriately timed reception and transmission parameters therein, respectively.

In the past, it has been common to generate high-level, wide-band noise and rely on this to both mask passive and jam active enemy sonars. Although suitable for many purposes, so doing leaves a great deal to be desired because masking is usually incomplete, and, hence, it becomes possible for expert sonar operators, operating appropriate sonar equipment, to receive and distinguish noise signals from signals characteristic of various and sundry vessels, thereby allowing the enemy to plan their attack or evasion more easily and quickly.

In addition, the prior art also employs wideband noisemakers to mask passive sonars and narrow-band jammers to jam active sonars, but these devices also leave something to be desired because of lack of proper correlation therebetween and due to the fact that appropriately timed frequency sampling is not included. The frequency range within which an active sonar may be successfully used is ordinarily about one thousand times as wide as the bandwidth actually required for operation of a single active sonar. As a result, a wide-band noise maker covering the entire range of useful sonar frequencies may radiate 99.9 percent of its signal at frequencies that are outside the frequency band accepted by any given active sonar set. This 99.9 is dissipated and wasted for the most part, leaving insufficient power remaining in 0.1 percent signal frequencies to properly do the job of jamming any enemy sonars operating therewithin. Although this shortcoming led to the development of automatic narrow-band sonar jammers that could concentrate their output within the band of acceptance of a single enemy sonar, if two or more of such sonars were used simultaneously at different frequencies, only one of them could be effectively jammed at any given time or within any time range that would produce effective results during combat maneuvers.

The present invention overcomes most of the disadvantages of the aforementioned prior art devices in that, in effect, it combines a wide-band noisemaker and a plurality of automatic narrow frequency band jammers which operate on a substantially random time-shared basis. Furthermore, the actual frequency transmitted by the enemy, if any, is timely sampled regardless of whether one or more transmission or transmissions are occurring, and said sample is broadcast back to the enemy sonar or sonars, as the case may be, at a rate that is sufficiently rapid to effectively jam each and every one of them simultaneously. Of course, it can readily be seen that due to the fact that the enemy's own active sonar signal frequency is rebroadcast for jamming purposes, no power is wasted on extraneous frequency transmission.

It is, therefore, an object of this invention to provide an improved masking and jamming type sonar countermeasure system.

Another object of this invention is to provide a sonar countermeasure system for wideband masking of passive sonar equipment and jamming of active sonar equipment on a random time-shared basis.

A further object of this invention is to provide an improved sonar masking and jamming system that may be incorporated in surface vessels, submarine boats, and self-propelled underwater missiles and torpedoes.

Another object of this invention is to provide a means for decoying enemy sonar apparatus and the vessels and weapons associated therewith.

Still another object of this invention is to provide an improved sonar countermeasure which employs successive frequency sampling of active enemy sonar signals over a wide frequency range and uses same for high power jamming thereat while preventing power loss that would otherwise occur if extraneous frequency signals were broadcast therewith.

A further object of this invention is to provide an improved sonar countermeasure means which automatically places a top priority on the enemy sonar frequency sample that was received last and the lowest priority on the oldest frequency sample.

A further object of this invention is to provide a sonar masking and jamming countermeasure system which compensates for variation in input level without producing modulation and cross-modulation products.

Another object of this invention is to provide an improved sonar countermeasure device which permits the output stage thereof to be driven to maximum power without the possibility of "capture" by the strongest of various input signals.

Another object of this invention is to provide an improved sonar countermeasure device which provides the masking and jamming of enemy sonar systems in the five to seventy kilocycle frequency range with signals of such complex and inconsistent characteristics as to be irritating and frustrating to enemy sonar operators.

Other objects and many of the attendant advantages of this invention will readily be appreciated as the same becomes better understood by reference to the following detailed description when considered in connection with the accompanying drawings in which like reference numerals designate like parts throughout the figures thereof and wherein.

Figure 1:
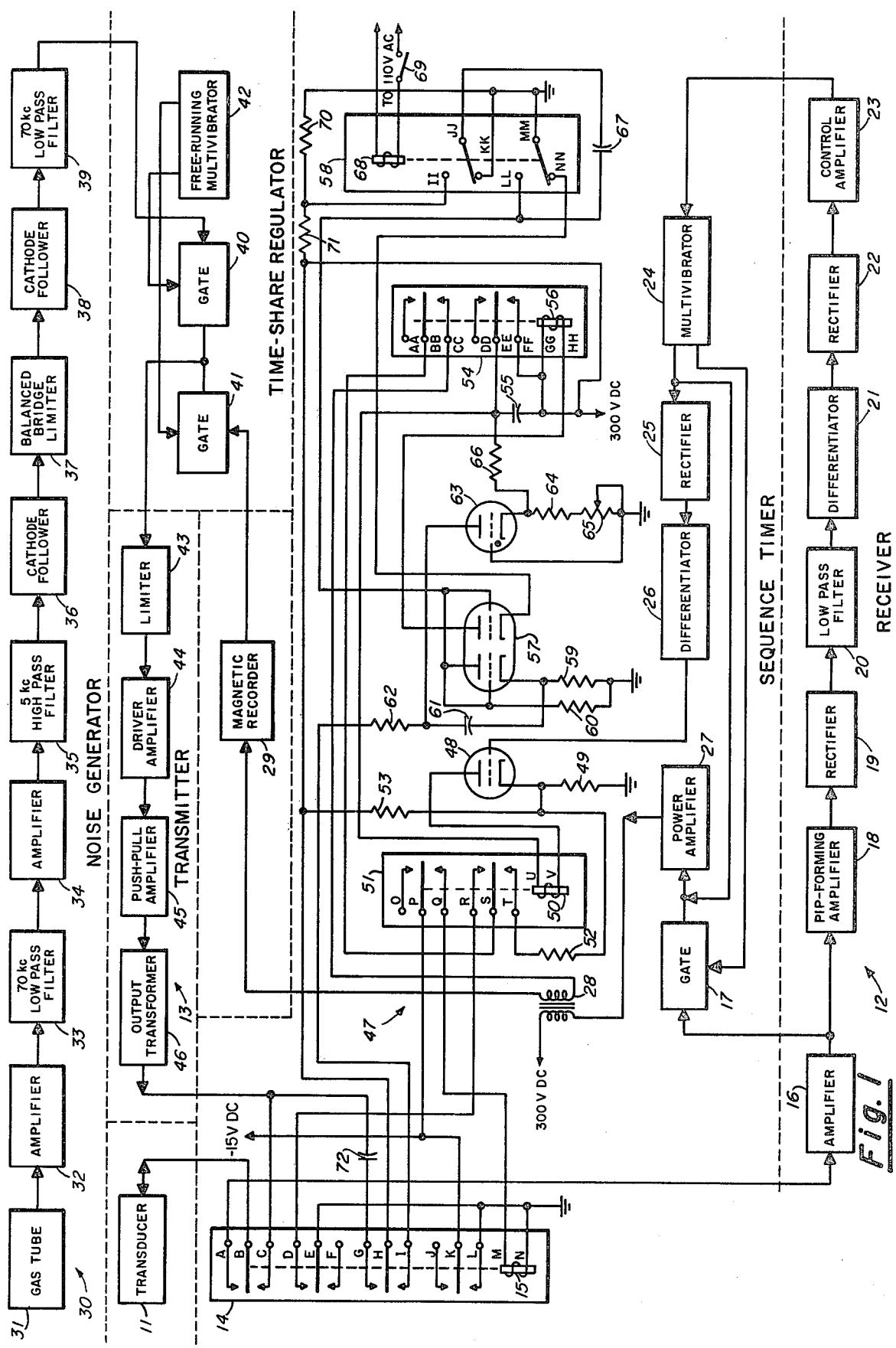
FIG. 1 is a diagram of the subject invention, partially in block form and partially in schematic form.
Figure 2:
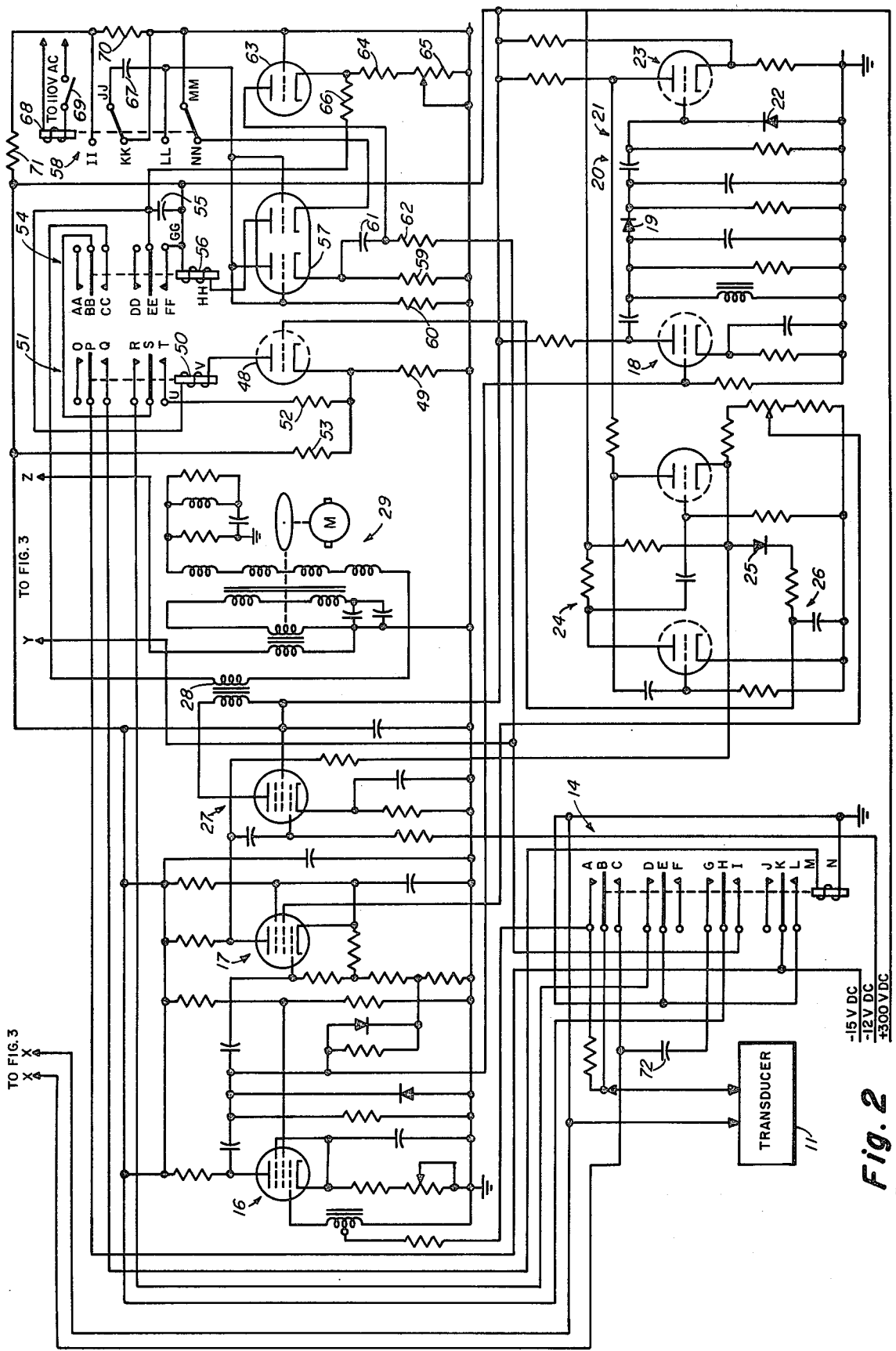
FIGS. 2 and 3 are detailed schematic diagrams of the various components illustrated in FIG. 1, showing the preferred interconnections therebetween.
Figure 3:
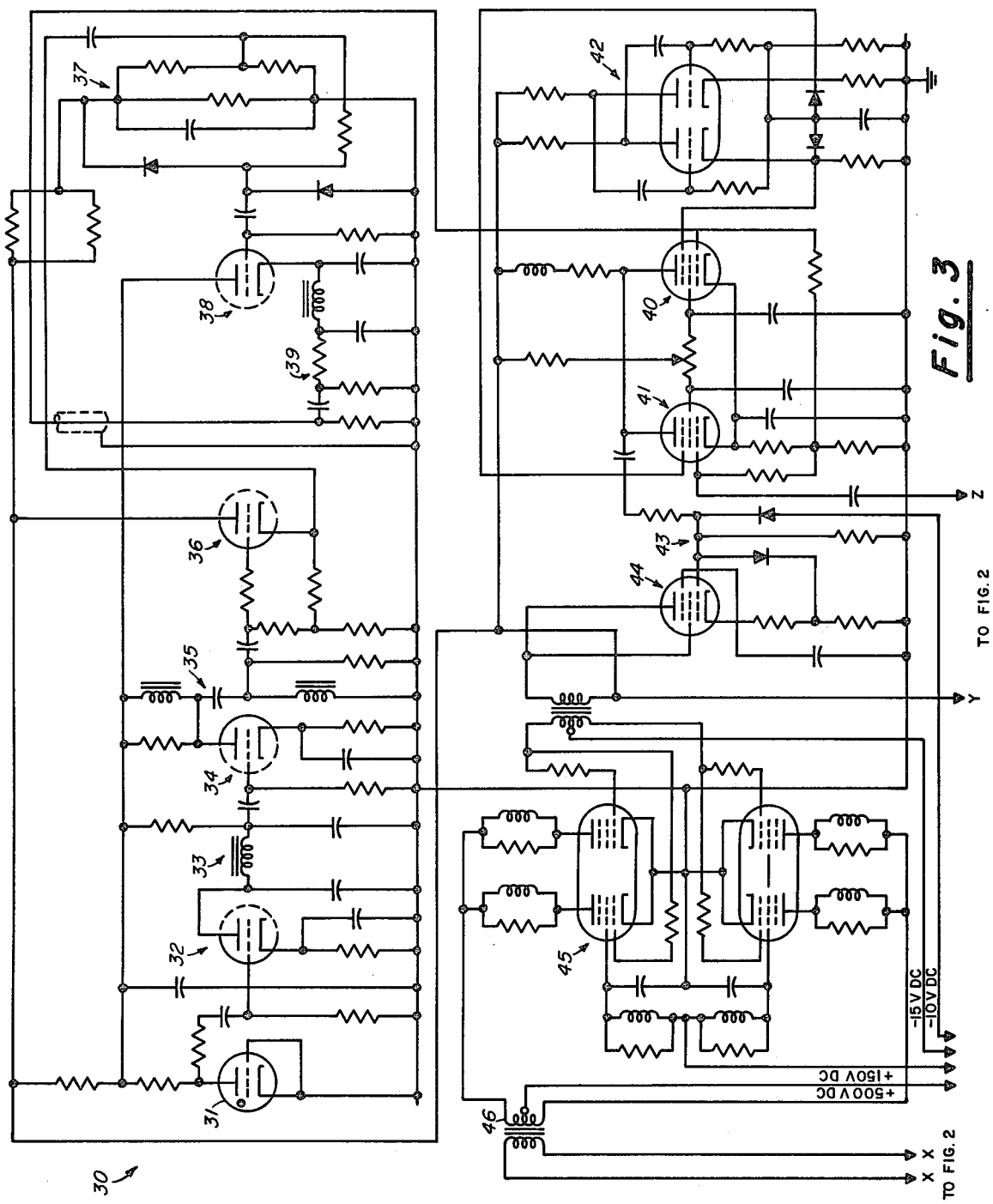

Referring now to the drawings wherein like reference characters designate like or corresponding parts throughout the several views, there is shown in FIGS. 1, 2, and 3 a transducer 11 which may, for example, be of the reversible electroacoustical type which produces electrical signals upon excitation by received acoustical energy and broadcasts acoustical energy upon excitation by electrical signals. Of course, if so desired, depending on operational circumstances, said transducer 11 may be of the electromagnetic type, too. A receiver 12 and a transmitter 13 are appropriately coupled to said transducer by switch contacts A-B and B-C of a relay 14 by the timely de-energization and energization of a solenoid 15.

Considering first the receiver section and a portion of the sequence timer section, it is shown in FIGS. 1 and 2 that contact A of relay 14 is connected to a preamplifier 16 which, in turn, has its output coupled to a gate 17 and a pip-forming amplifier 18. The output thereof is then fed through a rectifier 19, a low-pass filter 20, a differentiator 21, another rectifier 22, a control amplifier 23 to a monostable multivibrator 24. A pair of outputs from multivibrator 24 are applied to the screen and output plate circuits of gate 17, respectively. The multivibrator output applied to said plate is also applied to a rectifier 25, from which it is fed to a differentiator 26. The output of gate 17 occurs as a result of the activation thereof by the aforesaid outputs from multivibrator 24, and it is, thus, timely fed through a power amplifier 27 and through a coupling transformer 28 to a magnetic recorder 29 that is driven at 3600 rpm by a synchronous motor and which is of the type that receives, stores, and plays back electrical signals at a rapid rate, when other factors for so doing are favorable, as will be explained in detail subsequently.

Considering now the noise generator, time-share regulator, and transmitter sections of the subject invention, there is shown in FIGS. 1 and 2 a random noise or pseudo noise generator 30 having a gas tube 31 of the 6D4 type, or the like, that generates a wideband electrical output signal which is fed through an amplifier 32, a seventy kilocycle low-pass filter 33, an amplifier 34, a five kilocycle high-pass filter 35, a cathode follower 36, a balanced bridge limiter 37, a cathode follower 38, and another seventy kilocycle low-pass filter 39 to a gate 40.

Another gate 41 receives its input signal from the output of the aforementioned magnetic recorder 29. Gates 40 and 41 are alternately opened by a multivibrator 42 of the asymmetrical free-running type, of the random type, of the pseudo random type or of the predetermined program type as desired, which, of course, causes gates 40 and 41 to alternately and timely apply their respective output signals obtained from noise generator 30 and magnetic recorder 29 to a limiter 43. The output of limiter 43 is then fed through a driver amplifier 44, a push-pull amplifier 45, and an output transformer 46 to switch contact C of relay 14, from which it is timely passed through switch contact B thereof and on to transducer 11 during the transmit portion of the operational cycle, as will be more fully explained below.

The receive and transmit portions of masking and jamming operations of the subject invention are regulated and correlated by a sequence timer 47 having a relay control triode tube 48 of the 6C4 type or the like having a cathode, a grid, and a plate. The cathode thereof is coupled to ground through a resistor 49, the grid thereof receives its input from the output of the aforementioned differentiator 26, and the plate thereof is connected to terminal V of a solenoid 50 that timely actuates a relay 51. The cathode of triode 48 is coupled through a resistor 52 to contact T of relay 51 and is also coupled through a resistor 53 to switch contact H of relay 14 and a direct current voltage supply of about three hundred volts. Solenoid 50 also has its other terminal U connected to switch contact EE of a third relay 54, which, in turn, is connected through a capacitor 55 to switch contact FF of relay 54 and a high direct current potential of the order of three hundred volts. A solenoid 56 actuates relay 54 and has one of its terminals, namely GG, coupled to switch contact FF, and the other of its terminals, viz., HH, coupled to the plate of the right hand triode of a dual triode tube 57 of the 12AU7 type or the like. The cathode thereof is coupled to switch contact NN of a reset relay 58, and the grid thereof is connected to the grid and plate of the left hand triode of said dual triode tube 57. The cathode thereof is coupled through a resistor 59 to ground. Also, the grid thereof is grounded through a resistor 60. In addition, the cathode of the left hand triode of tube 57 is connected through a series connected capacitor 61 and resistor 62 to switch contact I of relay 14. The junction of interconnection of capacitor 61 and resistor 62 is coupled to the plate of a thyratron tube 63 of the 6D4 type or the like. The grid thereof is grounded, and the cathode thereof is also grounded through a series connected resistor 64 and potentiometer 65 which, likewise, has its slide member grounded. A resistor 66 interconnects the cathode of thyratron 63 and switch contact EE of relay 54.

In addition to being connected to the grid of the right hand triode of dual triode tube 57, the plate of the left hand triode thereof is connected to switch contact LL of reset relay 58. Switch contacts JJ and LL of relay 58 have a capacitor 67 connected therebetween, while switch contacts KK and MM thereof are grounded. A solenoid 68 actuates the switch contacts of reset relay 58 and is adapted for energization by a one hundred and ten volt alternating current or the direct current equivalent thereof through a manually operable switch 69.

As can readily be seen, relay 14 is actually slaved to relay 51, in that solenoid 15 is timely connected to a DC potential difference by having solenoid terminal N grounded and solenoid terminal M effectively connected to −15 volts direct current through switch contacts Q-P of relay 51.

As previously mentioned, contact T of relay 51 is connected to one terminal of resistance 52. Also, contacts S and R thereof are respectively coupled to contact BB of relay 54 and contact D of relay 14, respectively.

Terminal U of relay solenoid 50 is coupled to contact EE of relay 54, to capacitor 55, and to resistance 66. Contact CC of relay 54 is connected to one terminal of the secondary winding of transformer 28, and contact FF of relay 54 is coupled to terminal GG of solenoid 56 and to a high positive potential of the order of three hundred volts direct current. Contacts KK and MM of relay 58 are grounded and coupled through a pair of series connected resistors 70 and 71, to the aforesaid three hundred volt direct current positive potential, to one terminal of resistor 53, and to contact H of relay 14. Contact II of relay 58 is connected to the interconnecting junction of series connected resistors 70 and 71. A capacitor 72 interconnects contact G of relay 14 and contact C thereof and the output of transformer 46 in order to block the aforesaid three hundred volt direct current positive potential therefrom during receiving operations.

The overall operation of the subject invention may be categorized as having receiving and transmitting operations which are timely put into effect by a sequence timing operation. For the purpose of clarity, each of said operations will be discussed briefly below.

Figure 4:
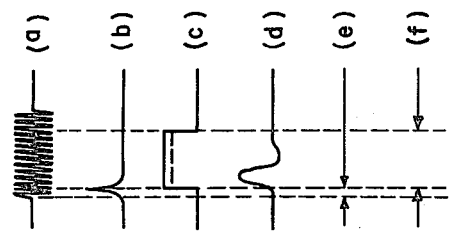
FIG. 4 is a graphical illustration of signal waveforms occurring as outputs of several of the components of the receiving and timing circuit portions of the invention.

During the receive condition, relays 14 and 51, are in a de-energized condition and each of their respective movable contacts are in the up position in contact with the upper switch contacts thereof. The receive condition is the condition which exists until a suitable signal is received from an echo-ranging enemy sonar. Such a signal may be a ping like that shown in FIG. 4(a). As it is received by transducer 11, it is converted to the electrical equivalent which is conducted through closed contacts A-B of relay 14 to pre-amplifier 16, where it is amplified to a more useful level After amplification, the received signal is fed to the grid of normally closed or inoperative gate 17 and also to the grid of pip-forming amplifier 18 where it is preformed into a trigger-like pulse. Appropriate shaping and polarizing thereof for accurate timing purposes is effected by rectifier 19, low-pass filter 20, differentiator 21, rectifier 22, and control amplifier 23 which are serially combined to produce an output signal such as is shown in FIG. 4(b). Close examination of the waveform of FIG. 4(b) with respect to the ping waveform of FIG. 4(a) illustrates that the resulting trigger pulse is somewhat delayed with respect to the leading edge thereof. Ordinarily, the time delay between the leading edge of received enemy sonar ping depicted in FIG. 4(a) and the trigger pulse of FIG. 4(b) is between one hundred and two hundred and fifty microseconds. It varies with the amplitude and frequency of the incoming sonar ping and the design characteristics of the aforementioned involved circuits, and thereby actually constituting what amounts to a signal processing delay. An exaggerated exemplary indication of this delay is depicted in FIG. 4(e).

This delayed trigger pulse is then applied to monostable multivibrator 24 which, in turn, simultaneously develops a pair of square wave pulses of two and three-quarter millisecond duration that is respectively coupled at appropriate voltage levels to the plate and screen of gate 17 for activation thereof, in order to pass the received enemy sonar ping of FIG. 4(a) therethrough. FIG. 4(c) represents said square waves, and the voltage levels thereof applied to said plate and screen of gate 17 are illustrated by the top solid line and lower dotted line, respectively. FIG. 4(f) shows the aforesaid two and three-quarter milliseconds receiving-recording time period which, of course, corresponds, timewise, with the trailing edge of the square waveform generated by multivibrator 24, shown in previously mentioned FIG. 4(c). It should be noted, however, that monostable multivibrator 24 should be so designed that it will be tripped only if the incoming ping is of sufficient predetermined amplitude, thereby preventing energization of the subject receiver portion of the invention by spurious noise signals and the like.

While gate 17 is so energized, it is opened and passes about two and three-quarter milliseconds of the received sonar signal to power amplifier 27 where it is amplified and applied to the primary winding of transformer 28. Since contacts BB and CC of relay 54 and contacts R and S of relay 51 are closed during the receive condition, the secondary winding of transformer 28 is connected between ground and magnetic recorder 29, and, consequently the received power amplified sonar ping is recorded therein for approximately two and three-quarter milliseconds and stored until needed during the transmission period. This recording and storage takes place regardless of the frequency of the incoming enemy sonar ping, and, thus, it can be seen that subsequent transmissions by the subject invention are keyed to samples thereof even if in successive listening intervals different frequency pings arrive from a plurality of different enemy sonar sets operating at their own individual frequency.

The sequence timer which converts the invention from a receive condition to a transmit condition is also effectively actuated, timewise, by the shaped output of multivibrator 24, but it is actually triggered by a trigger pulse similar to that depicted in FIG. 4(d) which is formed by rectifying and differentiating one of the square waveforms of FIG. 4(c) by rectifier 25 and differentiator 26, respectively. This trigger pulse is applied to the grid of relay control triode 48, thereby causing same to conduct and energize solenoid 50 of relay 51. Energization thereof, after a delay which is inherent in relay 54, causes all movable contacts thereof to close with their respective lower switch contacts, and so doing causes a holding current to continue to flow through solenoid 50 by, in effect, connecting resistance 52 in parallel with resistance 49 through contacts S and T of relay 51, contacts BB and CC of relay 54, the secondary winding of transformer 28, and the ground inherently existing in magnetic recorder 29. This, in turn, reduces the cathode bias voltage for relay control tube 48 sufficiently to cause it to continue conducting, thereby holding solenoid 50 in an energized condition.

When relay 51 is energized in the transmit condition, it, in turn, causes relay 14 to become energized into the transmit position as a result of applying a potential difference across solenoid 15 thereof, due to the closure of contacts P and Q of relay 51. Of course, at this time, the receiver circuit is disconnected from transducer 11 and the transmitter circuit is connected thereto by the opening of switch contacts A and B and the closing of contacts of B and C. Moreover, at this time, an important timing operation begins to occur due to the fact that contact H of relay 14 closes with contact I thereof and places a high positive voltage of the order of three hundred volts across series connected resistor 62 and capacitor 61, causing capacitor 61 to charge in accordance with the RC time constant determined by the resistance and capacitance values selected therefor, respectively. After a predetermined period of time, approximately 12 seconds, capacitance 61 becomes charged sufficiently to apply enough voltage to the plate of thyratron 63 to cause it to fire. When this occurs, said capacitor 61 discharges through resistor 59 in the cathode circuit of the left hand diode of dual triode 57, through ground, through potentiometer 65, and through resistors 64 and 66, thereby causing a potential difference to exist across said resistor 59 and the cathode terminal thereof to be negative with respect to ground. This, in turn, causes the left hand triode of dual triode 57 to conduct, increasing the plate voltage thereof, since, in this instance, it is acting as a diode rather than as a triode. Because the grid of the right hand triode of tube 57 is coupled to the left hand plate thereof, it, too increases in potential in a negative direction and causes the right hand triode thereof to cease conducting with the result that solenoid 56 is de-energized and relay 54 opens.

While solenoid 56 of relay 54 is being de-energized by the reduction in plate current of the dual triode 57, capacitor 67 is being charged in a negative direction because it effectively interconnects the left hand plate thereof and ground, as a result of the closed condition of contacts JJ and KK of relay 58. Consequently, once capacitor 61 has discharged sufficiently to allow the left hand triode cathode of tube 57 to become positive with respect to its plate, and thereby cease conducting, the charging of capacitor 67 is completed and it then begins to discharge through resistor 60. After capacitor 67 has discharged sufficiently, the right hand section of tube 57 will again pass sufficient current to energize solenoid 56 and close relay 54—that is, respectively move the movable contacts thereof in contact with those contacts shown in the lower position in the drawing. Relay 54 will actually be open for approximately one-half second due to the accumulated delays of discharging capacitors 61 and 67 and the inherent reaction time of relay 54. De-energizing relay 54, of course, causes relays 51 and 14 to be de-energized which, in turn, again causes transducer 11 to be coupled to the receiver circuit. But, since contacts BB and CC of relay 54 are open when relay 54 is de-energized, the receiving circuit is incomplete and the subject invention can neither receive nor transmit until relay 54 is re-energized. Re-energization of relay 54 occurs at the end of the aforementioned one-half second delay period and the entire circuit is again put into condition for receiving another enemy sonar signal sample.

Now, as previously mentioned, a predetermined period of time transpires while the aforementioned sequence timing operation takes place. In the preferred embodiment of the invention herein disclosed, this period of time is of the order of twelve seconds for transmission followed by a one-half second inactive period. These time intervals are due to the inherent physical and electrical characteristics of the component parts selected for operating the sequence timer circuit. During the aforesaid twelve seconds, the transmission portion of the entire cycle is operative and transducer 11 is alternately broadcasting a pair of acoustical signals in accordance with a relatively random sequential timing program, a pseudo random sequential timing program, a time-shared assymetrical program that is not harmonically or subharmonically related to the speed of the recording medium, or any other desired, predetermined, sequential timing program, depending upon the design selection of the type of multivibrator employed and incorporated in the subject invention as multivibrator 42.

The transmitter circuit operates in such manner as to broadcast wideband noise signals and narrow-band sonar CW signals on a time-shared basis within the period of time allotted for transmission by the aforementioned sequence timer. This operation could actually be considered as a sub-time-sharing operation if desired, because the entire receive and transmit operations are time shared on a predetermined program basis and the two types of transmitted signals are, themselves, time shared during the transmit position of the operational cycle. One difference, of course, in said time sharing is that in the former case the time allocated to both transmit and receive conditions is more or less determined by the inherent design characteristics of the component parts used in the respective circuits or the resulting combination thereof, while in the latter case, the time sharing of the broadcast of the wideband noise signals and the narrow band sonar CW signals is essentially on a random time basis without any adverse interference therebetween or adverse transients from other circuit elements of the subject invention.

Briefly, the operation of the transmission portion of the operational cycle is as follows. The noise generator consists of a gas tube which conducts in such manner as to generate an irregular output signal which randomly varies from, perhaps, zero to one hundred kilocycles per second. This random output signal is amplified by amplifier 32, filtered by seventy kilocycle low-pass filter 33, reamplified by amplifier 34, filtered again by a five kilocycle high-pass filter 35 to provide a wide band random noise output signal falling within the five to seventy kilocycle frequency band which, for all practical purposes, appears to be highly effective in masking passive sonar systems. This noise signal is then passed through circuit isolation cathode follower 36 to balanced bridge limiter 37 (which provides more than twenty db of limiting). It is then cathode follower coupled by circuit isolation cathode follower 38 to seventy kilocycle low-pass filter 39 to insure frequency control and then fed to gate 40.

The narrow band sonar signal that is broadcast on a time shared basis with said wideband noise signal is actually a recorded sample of the ping or pings received from one or more enemy active sonars. For the purpose of recording and storing such sonar pings, magnetic recorder 29 is employed. This recorder should be of the type that has an endless loop or continuous rotating drum or disc on which samples of the frequency to be jammed is recorded. Said loop or disc revolves at such speed as will fill about one-third thereof while recording and storing sample enemy sonar signals for approximately two and three-quarter milliseconds time duration. In the usual operation, an additional frequency sample is recorded each time the subject device completes a transmission and pauses to listen again. Thus, it can readily be seen that the point on the loop where a new recording may start is subject to chance. It is possible, but not probable, that, as the loop revolves, the new recording could exactly occupy the recorded part that contained information from the previous recording. In such case, all of the older frequency signals would be replaced with new sonar signals. In a more likely situation, though, the magnetic recorder loop revolves and the new sonar frequency sample is recorded in an area not occupied by the immediately previous recording. In many cases, a new recording will be partly in the area not previously recorded and partly in the area containing frequency information from the previous sample and, accordingly, only part of the previous sample will remain, and, thus, the jamming intensity of the signal resulting from the older sample will be reduced. Therefore, the probability that effective jamming will result from the frequency sample that was first recorded decreases as the number of frequency samples recorded is increased. Obviously, an endless loop or rotating drum recorder operating in conjunction with the receiver, transmitter, and sequence timing circuits makes such operation feasible. Furthermore, it should be noted that the use thereof causes transmission emphasis to be placed on the more recently recorded sonar signal samples from any number of enemy sonar sets. Since these samples are the signals that are broadcast on a time-shared basis with the aforementioned wideband noise signals, jamming takes place at only the received sample frequencies—a relatively ideal condition which prevents the waste of power that would otherwise occur due to broadcasting at frequencies not being received by the attacking enemy sonar sets. Since there is no synchronism between the time of arrival of enemy sonar ping and the drum or loop rotation or motion of the recording medium, random time-sharing is inherent in the jamming portion of the transmission.

Random alternation of broadcasts of wideband noise and sonar CW signals is effected by respectively feeding each of the outputs from seventy kilocycle low pass filter 39 of the noise generator and magnetic recorder 29 to gates 40 and 41 at an alternation rate of approximately fifty times per second during the total transmission time interval of about twelve seconds. Such regulation is, of course, achieved by the timely triggering of gates 40 and 41 by previously mentioned free-running multivibrator 42. In other words, said multivibrator opens gate 40 and closes gate 41 and vice versa in random fashion so that analysis of broadcast periods of the noise and CW signals is practically impossible, which, accordingly, facilitates masking and jamming of most known inherent unavoidable signals of all friendly vessels concerned as well as the echo-ranging-search pings from enemy sonar sets.

Either the output of gate 40 or gate 41 is limited within a useful positive and negative amplitude range by limiter 43 and further amplified as desired by driver amplifier 44 and push-pull amplifier 45, from which it is transformer coupled by output transformer 46 to switch contacts C and G for further transfer to transducer 11 and resistor 62 of the sequence timer circuit. Obviously, transducer 11 broadcasts whichever signal is emanating from gates 40 or 41, and of course, that portion of said signals supplied to resistor 62 is used to initiate the interim operation that is required to enable the sequence timer to convert the subject multiple sonar masking and jamming countermeasure system from a transmitting condition to a condition where it is ready to sample new enemy sonar signals.

Approximately a one and one-half second total period of time transpires while capacitor 67 discharges through resistor 60, while both triodes of tube 57 are deactivated, while both triodes are again reactivated after capacitor 67 has discharged sufficiently to bias same in a conductive state, and while solenoid 56 of relay 54 is being energized and mechanically switches the movable contacts thereof. Since this one and one-half second interval of time occurs between the transmit and receive portion of the operational cycle, it serves a very useful purpose. The entire system is inactive at this time and this condition, in turn, permits reverberations, if any, from the transmission to decay so that a relatively low receiving threshold or high receiving sensitivity may be used without danger of the receiver circuit being triggered by its own reverberation. After completing this silent portion of the operational cycle, the subject invention will again operate as a receiver until another enemy sonar signal is heard, at which time, the entire operational cycle is repeated unless relay 58 is being energized due to the manual closing of push-button switch 69 by the sonar operator.

Closing switch 69 causes the movable switch contacts of relay 58 to move from their normally down position, as shown in FIGS. 1 and 2, to their upper respective switch contacts. So doing immediately deactivates the entire countermeasure system and makes it silent. This may have a two-fold purpose. First, the captain of the ship may silence his own sonar countermeasure at any time during any portion of the operational cycle merely by holding switch 69 closed. Second, he may immediately reset the subject system to the receive condition to obtain new enemy sonar signal samples at will, thereby facilitating the broadcasting of higher priority, more important jamming signals at more pertinent frequencies. During rapidly changing combat conditions, this aspect of the operation proves to particularly beneficial.

Silencing or resetting, as the case may be, is accomplished because capacitor 67 has its negative terminal connected to a high positive potential through contacts II and JJ of relay 58, causing said capacitor to discharge immediately and place a negative potential on the grids of dual triode 57, thereby cutting it off and deenergizing relay 54. Of course, when relay 54 is de-energized, relays 51 and 14 are likewise deactivated and no signals are broadcast or received by the countermeasure system constituting this invention.

Again, to recapitulate very briefly, the present invention operates as a receiver until a suitable sonar signal is received. Then within about twenty milliseconds, it starts transmitting jamming signals at the frequency of the received signal and at any other frequency or frequencies that may remain on the recording loop from previous recordings, along with time-shared wideband noise. Transmission occurs for approximately twelve seconds and then the entire system becomes inactive for about one-half second to permit decay of the previously mentioned reverberations or other transient signals. At this time reception takes place again and the operational cycle is repeated until the counter-measure system is turned off by the sonar operator.

The foregoing disclosure obviously pertains to a device which solves the problem of masking passive enemy sonars and jamming active enemy sonars. However, it should be understood that the principles involved therein are appropos to the solution of comparable radar and communications jamming problems, that one skilled in the art could make the necessary design changes to incorporate elements compatible with the respective frequencies and environmental conditions concerned from the teachings herein presented, and that so doing falls within the scope and spirit of the invention.

Furthermore, obviously many modifications and variations of the present invention are possible in the light of the above teachings. It is, therefore, to be understood, that within the scope of the appended claims, the invention may be practiced otherwise than as specifically described.

What is claimed and desired to be protected by Letters Patent of the United States is:

1. A masking-jamming sonar countermeasure system comprising in combination, a receiver, a transmitter, a sequence timer connected between said receiver and said transmitter for regulating the operative time intervals thereof, and means coupled to the input of said transmitter for driving same with predetermined sonar signals and psuedo noise signals alternately applied thereto on a time-shared basis.

2. A masking-jamming sonar countermeasure system comprising, an electrocoustical transducer, a receiver, a transmitter, a sequence timer means connected to said receiver and transmitter for alternately coupling same to said transducer, manually operable means connected to said sequence timer means for effecting reception by said receiver at any predetermined instant and means coupled to the input of said transmitter for driving same with frequency samples of sonar signals received by said receiver and pseudo noise signals alternately applied thereto on a random time-shared basis.

3. An electronic countermeasure system for respectively masking and jamming passive-listening and echo-ranging target search system comprising in combination, means for receiving echo-ranging signals from a predetermined environmental medium, means coupled to said receiving means for recording and storing said received echo-ranging signals for a predetermined time interval, means for generating wideband random noise signals, means for broadcasting said recorded echo-ranging signals and said generated wideband random noise signals to and through the aforesaid predetermined environmental medium means appropriately interconnecting said recording means, said generating means, and said broadcasting means for alternately supplying said recorded and stored echo-ranging signals and said wideband random noise signals to said broadcasting means, respectively, on a time-shared basis, and means connected between said receiving means and the aforesaid broadcasting means for regulating the reception and broadcast time periods thereof.

4. The device of claim 3 wherein said means for generating wideband random noise signals includes a gas tube, a first amplifier coupled to the output of said gas tube, a first seventy kilocycle low-pass filter coupled to the output of said first amplifier, a second amplifier connected to the output of said first seventy kilocycle low-pass filter, a five kilocycle high-pass filter connected to the output of said second amplifier, a first cathode follower connected to the output of said five kilocycle high-pass filter, a balanced bridge limiter coupled to the output of said first cathode follower, a second cathode follower connected to the output of said balanced bridge limiter, and a second seventy kilocycle low-pass filter coupled to the output of said second cathode follower.

5. The device of claim 3 wherein said means appropriately interconnecting said recording means, said generating means, and said broadcasting means for alternately supplying said recorded and stored echo-ranging signals and said wideband random noise signals to said broadcasting means, respectively, on a time-shared basis comprises a first gate connected between the output of said generating means and the input of said broadcasting means, a second gate connected between the output of said recording means and the input of said broadcasting means, and an asymetrical free-running multivibrator connected to said first and second gates for triggering same to alternate open and closed conditions.

6. The device of claim 3 wherein said means for receiving echo-ranging signals from a predetermined environmental medium includes a transducer, an amplifier adapted to be timely coupled to the output of said transducer, a pip-forming amplifier coupled to the output of said amplifier, a first rectifier coupled to the output of said pip-forming amplifier, a low-pass filter coupled to the output of said first rectifier, a differentiator coupled to the output of said low-pass filter, a second rectifier coupled to the output of said differentiator, and a control amplifier connected to the output of said second rectifier.

7. The device of claim 3 wherein said means for broadcasting said recorded echo-ranging signals and said generated noise signals to and through the aforesaid predetermined environmental medium comprises a limiter, a driver amplifier coupled to the output of said limiter, a push-pull amplifier coupled to the output of said driver amplifier, a transducer for transmitting wave energy upon excitation by electrical signals and producing electrical signals upon excitation by wave energy, and an impedance matched output transformer effectively connected between said transducer and the aforesaid push-pull amplifier.

8. The device of claim 7 wherein said transducer is an electroacoustical transducer.

9. The device of claim 7 wherein said transducer is an electromagnetic transducer.

10. A countermeasure system for respectively masking and jamming passive and active sonar systems comprising in combination, means for receiving sonar signals, means coupled to said receiving means for recording said received sonar signals for a predetermined interval of time, means for generating wideband pseudo noise signals, means for transmitting said recorded sonar signals and said generated wideband random noise signals, means interconnecting said sonar signal recording means, said wideband random noise signal generating means, and said transmitting means for asymetrically and alternately supplying said recorded sonar signals and said wideband pseudo noise signals to said transmitting means, and means connected between said sonar signal receiving means and the aforesaid transmitting means for sequentially timing the reception and transmission periods thereof.

11. A masking-jamming sonar countermeasure system comprising in combination, a transducer, a magnetic recorder for recording, storing, and playing back sonar signals received by said transducer, a gate interconnecting the output of said transducer and the input of said magnetic recorder, means responsive to the output of said transducer for timely opening and closing said gate, a wideband noise generator, a transmitter adapted for alternately being driven by the outputs from said noise generator and the aforesaid magnetic recorder, means interconnecting said magnetic recorder and said transmitter for alternately connecting the driving outputs thereof thereto on a random time-shared basis, and means interconnecting the aforesaid gate opening and closing means, said transmitter, and said transducer for effectively connecting said transducer to the input of said magnetic recorder and the output of said transmitter during predetermined successive time intervals.

12. A sonar countermeasure system for broadcasting masking and jamming acoustical signals to and through a subaqueous medium, comprising in combination, an elecroacoustical transducer adapted to be submerged within said subaqueous medium, a recorder adapted for recording, storing, and playing back sonar signals, a receiver effectively connected to the input of said recorder and adapted for being connected to the output of said transducer, a transmitter adapted for being coupled to the input of said transducer, a noise generator, a first gate interconnecting the output of said noise generator and the input of said transmitter, a second gate interconnecting the output of said recorder and the input of said transmitter, a free-running asymetrical multivibrator coupled to said first and second gates for alternately opening and closing same simultaneously on a predetermined time-shared basis, and means connected to said receiver and said transmitter for alternately coupling same to the output and input of said transducer respectively in accordance with a predetermined timing program.

13. A countermeasure system for masking and jamming multiple sonar systems comprising in combination, a noise generator for producing sonar masking signals, a recorder for recording, storing, and playing back sonar signals as active sonar jamming signals, regulator means coupled to the outputs of each of said noise generator and recorder for alternately gating same in rapid succession on a time-shared basis for randomly providing a continuous output signal, a transmitter connected to the output of said regulator means, a receiver, means connected to said receiver for timely gating and supplying the output therefrom to the input of the aforesaid recorder, a transducer adapted for receiving sonar signals and broadcasting sonar masking and jamming signals within a subaqueous medium, a relay adapted to alternately connect said transducer to said receiver and said transmitter, said relay being normally de-energized when said transducer is connected to said receiver and energized when said transducer is connected to said transmitter, means connected to said receiver for timely energizing said relay, and means connected to said relay energizing means and to said relay for deactivating and de-energizing same, respectively, to timely interrupt the broadcast of said sonar masking and jamming signals to said subaqueous medium by said transducer.

14. The device of claim 13 wherein the means connected to said receiver for timely gating and supplying the output therefrom to the input of the aforesaid recorder consists of an asymetrical monostable multivibrator, a gate coupled to one of the outputs of said multivibrator, a power amplifier coupled to the output of said gate, and a coupling transformer connected to the output of said power amplifier.

15. The device of claim 13 wherein said means connected to said receiver for timely energizing said relay includes an asymetrical monostable multivibrator, a rectifier coupled to one of the outputs of said multivibrator, a differentiator coupled to the output of said rectifier, a second relay effectively connected through a relay control tube to the output of said differentiator for timely energization thereby, and means interconnecting said relays for supplying electrical power to said first mentioned relay through said second relay.

16. The device of claim 13 wherein said means connected to said relay energizing means and to said relay for timely deactivating and de-energizing same, respectively, to interrupt the broadcast of said sonar masking and jamming signals to said subaqueous medium by said transducer comprises an RC timing circuit having a series connected resistor and capacitor adapted to be coupled to a high direct current voltage when said relay is energized, whereby the capacitor thereof is charged in accordance with a predetermined time constant, a thyratron effectively connected across said capacitor for rapidly discharging same at a given voltage level, and means responsive to the rapid discharge of said capacitor for disconnecting said relay energizing means from said relay, thereby disconnecting said transducer from said transmitter and interrupting the broadcast of said sonar masking and jamming signals to said subaqueous medium.

17. The device of claim 13 wherein said means connected to said relay energizing means and to said relay for timely deactivating and de-energizing same, respectively, to interrupt the broadcast of said sonar signals to said subaqueous medium by said transducer comprises a first triode having a cathode, a grid, and a plate, said cathode being effectively connected to ground through a resistor, said grid being effectively connected to ground through a resistor, a second triode having a cathode, a grid, and a plate, said grid of said first triode being connected to the plate thereof and to the grid of said second triode, a second relay, said plate of said second triode being connected to said second relay for timely energizing same, said cathode of said second triode being effectively connected to ground, a capacitor effectively connected between ground and the plate of said first triode, an RC circuit consisting of a resistor coupled in series with a capacitor connectable between the cathode of said first triode and a high direct current voltage source through said first mentioned relay, and a thyratron connected across the interconnection of said series connected resistance and capacitor and ground.

18. A method of masking and jamming multiple listening and echo-ranging systems comprising the steps of receiving echo-ranging signals from a predetermined environmental medium, recording samples of said received echo-ranging signals for a predetermined time interval, generating random pseudo noise signals, alternately broadcasting said recorded echo-ranging signals and said generated noise signals within the aforesaid predetermined environmental medium in rapid succession in accordance with a random time-shared program, and regulating the time intervals of the aforesaid receiving and broadcasting operations in a substantially predetermined asymetrical manner.

19. A method of masking and jamming multiple sonar systems comprising the steps of receiving sonar signals, recording samples of said received sonar signals, generating wideband noise signals, alternately transmitting said recorded sample sonar signals and said generated wideband noise signals in accordance with a random time-sharing program, and controlling the time intervals of receiving and transmitting said respective signals in accordance with a substantially predetermined asymetrical operational sequence.

* * * * *